(12) United States Patent
Tang et al.

(10) Patent No.: US 8,369,086 B2
(45) Date of Patent: Feb. 5, 2013

(54) ELECTRONIC DEVICE

(75) Inventors: Zi-Ming Tang, Shenzhen (CN);
Fa-Guang Shi, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 345 days.

(21) Appl. No.: 12/848,345

(22) Filed: Aug. 2, 2010

(65) Prior Publication Data

US 2011/0291955 A1 Dec. 1, 2011

(30) Foreign Application Priority Data

May 25, 2010 (CN) .......................... 2010 1 0182066

(51) Int. Cl.
*G06F 1/16* (2006.01)

(52) U.S. Cl. .................... 361/679.56; 455/347; 345/173

(58) Field of Classification Search ............. 361/679.02, 361/679.01, 679.55, 679.56; 455/347; 345/173
See application file for complete search history.

(56) References Cited

U.S. PATENT DOCUMENTS

| 6,728,519 | B1 * | 4/2004 | Okuda ........................ 455/90.3 |
| 7,312,397 | B1 * | 12/2007 | Chen et al. ...................... 174/66 |
| 8,094,439 | B2 * | 1/2012 | Lin ........................ 361/679.01 |
| 2009/0303668 | A1 * | 12/2009 | Zhao et al. ............... 361/679.01 |

* cited by examiner

*Primary Examiner* — Kent Chang
*Assistant Examiner* — Gerald Oliver
(74) *Attorney, Agent, or Firm* — Altis Law Group, Inc.

(57) ABSTRACT

An electronic device includes a housing, at least two elastic latching members, an inner frame received in the housing, and at least two fixing members. The housing defines at least two locking portions, the inner frame defines at least two fixing portions, the at least two elastic latching members are fixed to the corresponding fixing portions by the fixing members, and each of the elastic latching members protrudes from the corresponding fixing portion and is latched with the corresponding locking portions.

11 Claims, 5 Drawing Sheets

ELECTRONIC DEVICE

BACKGROUND

1. Technical Field

The present disclosure relates to electronic devices.

2. Description of Related Art

Electronic devices with a touch panel have become popular because of their enhanced appearance. A typical electronic device includes a housing, an inner frame, and a touch panel mounted on the inner frame. One of the housing and the inner frame forms a number of latching hooks, and the other defines a plurality of latching portions to receive the corresponding latching hooks. Thus, no fixing members are formed on an outer surface of the housing.

However, the housing of the electronic device is typically manufactured by punching a metal sheet or injecting one or more plastic materials into a mold. It is difficult to form the latching hooks in the inner surface of the housing due to the complexity of the housing structure, such that the manufacturing process becomes more costly.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
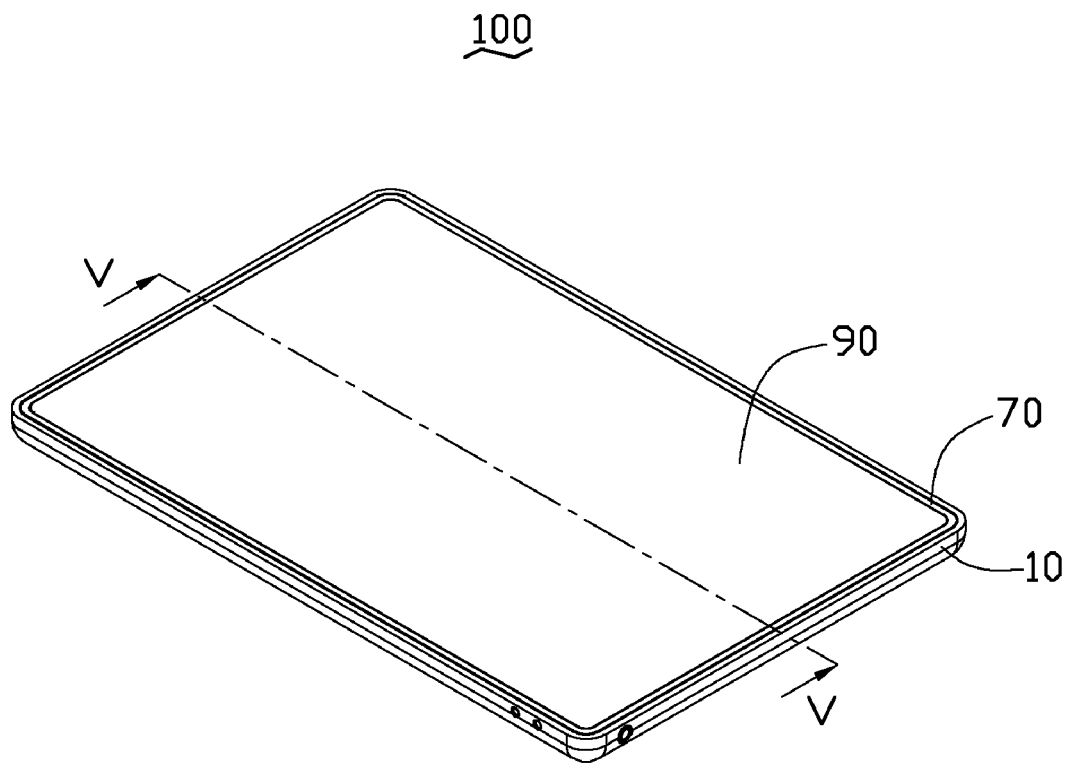
FIG. 1 is an assembled, isometric view of one embodiment of an electronic device.
Figure 2:
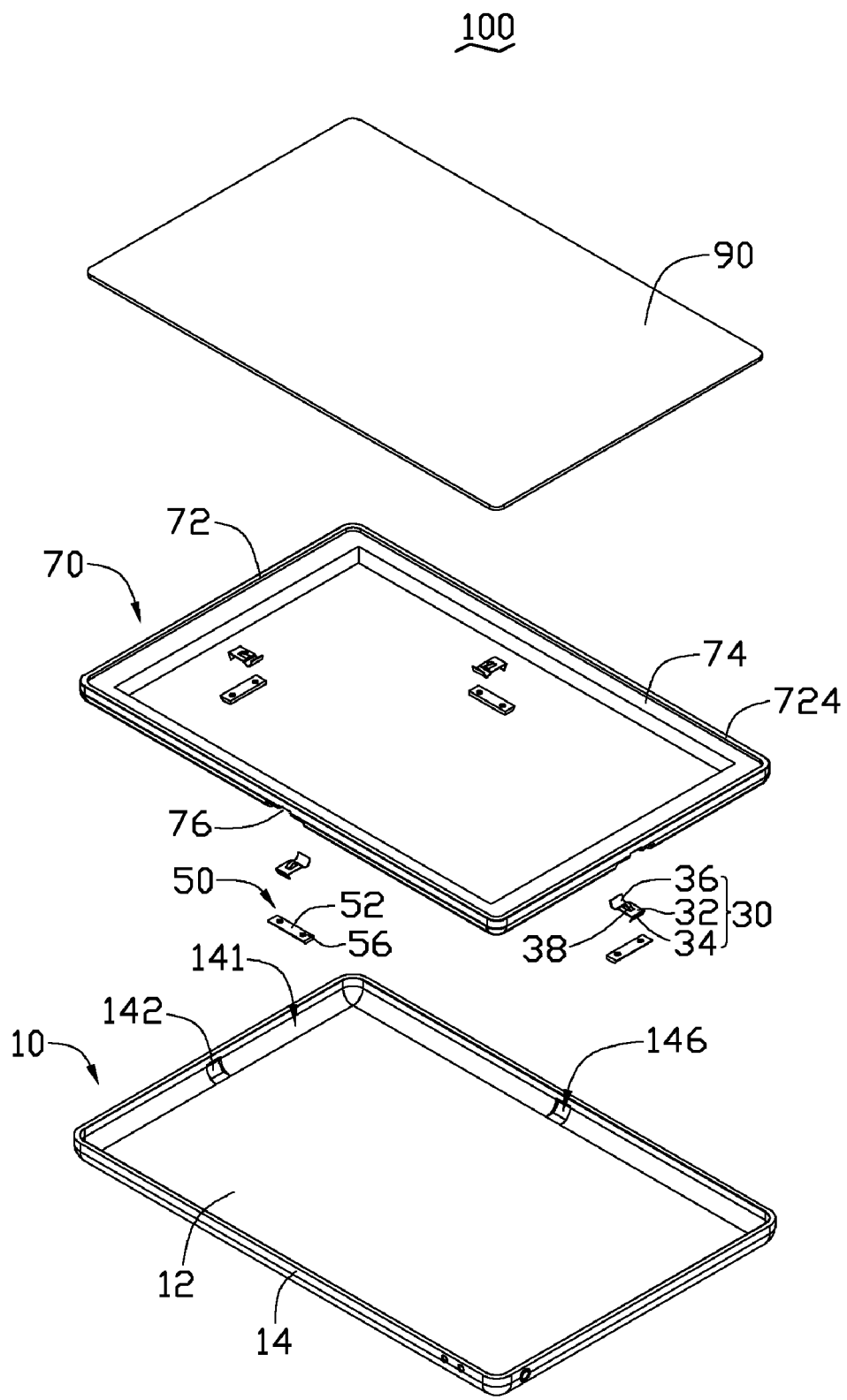
FIG. 2 is an exploded, isometric view of the electronic device of FIG. 1.

The disclosed electronic device may be a personal digital assistant (PDA), a MP3 player, a digital photo frame, a liquid crystal display monitor, or other device. Referring to FIG. 1 and FIG. 2, an embodiment of an electronic device 100 includes a housing 10, four elastic latching members 30, four fixing members 50, an inner frame 70, and a panel 90.

The housing 10 includes a base 12 and four sidewalls 14. The base 12 is a substantially rectangular board. Each sidewall 14 is a curved wall and extends from an edge or periphery of the base 12. Two ends of the sidewall 14 are joined to the ends of the adjacent sidewalls 14, respectively. Each sidewall 14 includes an inner surface 141 and a locking portion 142 defined in the inner surface 141. The locking portion 142 is a depression which includes an abutting surface 144 at a top of the locking portion 142 (shown in FIG. 5) adjoining the inner surface 141, and a connecting surface 146 extending from the abutting surface 144 to the base 12. The abutting surface 144 is substantially parallel to the base 12. The abutting surface 144 and the inner surface 141 cooperatively form a rounded corner 147 at a joint of the abutting surface 144 and the inner surface 141 (shown in FIG. 5).

The elastic latching member 30 is a substantially S-shaped clip and includes a main portion 32, a latching portion 34 formed at one end of the main portion 32, and a resisting portion 36 formed at the other end of the main portion 32. The main portion 32 is a substantially rectangular plate, and forms an elastic sheet 38 by punching the main portion 32 at the middle section of the main portion 32. The elastic sheet 38 is a curved sheet extending from the main portion 32 towards a side of the main portion 32. The latching portion 34 extends from one end of the main portion 32. The latching portion 34 is a flat sheet; and an acute angle is defined between the latching portion 34 and the main portion 32. The latching portion 34 and the elastic sheet 38 are at opposite sides of the main portion 32 respectively. The resisting portion 36 is a curved sheet. The resisting portion 36 extends from the other end of the main portion 32 away from the latching portion 34. The latching portion 34 and the resisting portion 36 are bent in different directions.

The fixing member 50 is a substantially rectangular bar, and includes a first surface 52 and a second surface 54 opposite to the first surface 52. Both of the first surface 52 and the second surface 52 are planar surfaces, and are parallel to each other. The fixing member 50 defines two through holes 56 which are spaced apart. Each of the through holes 56 runs through the first surface 52 and the second surface 54.

Figure 3:
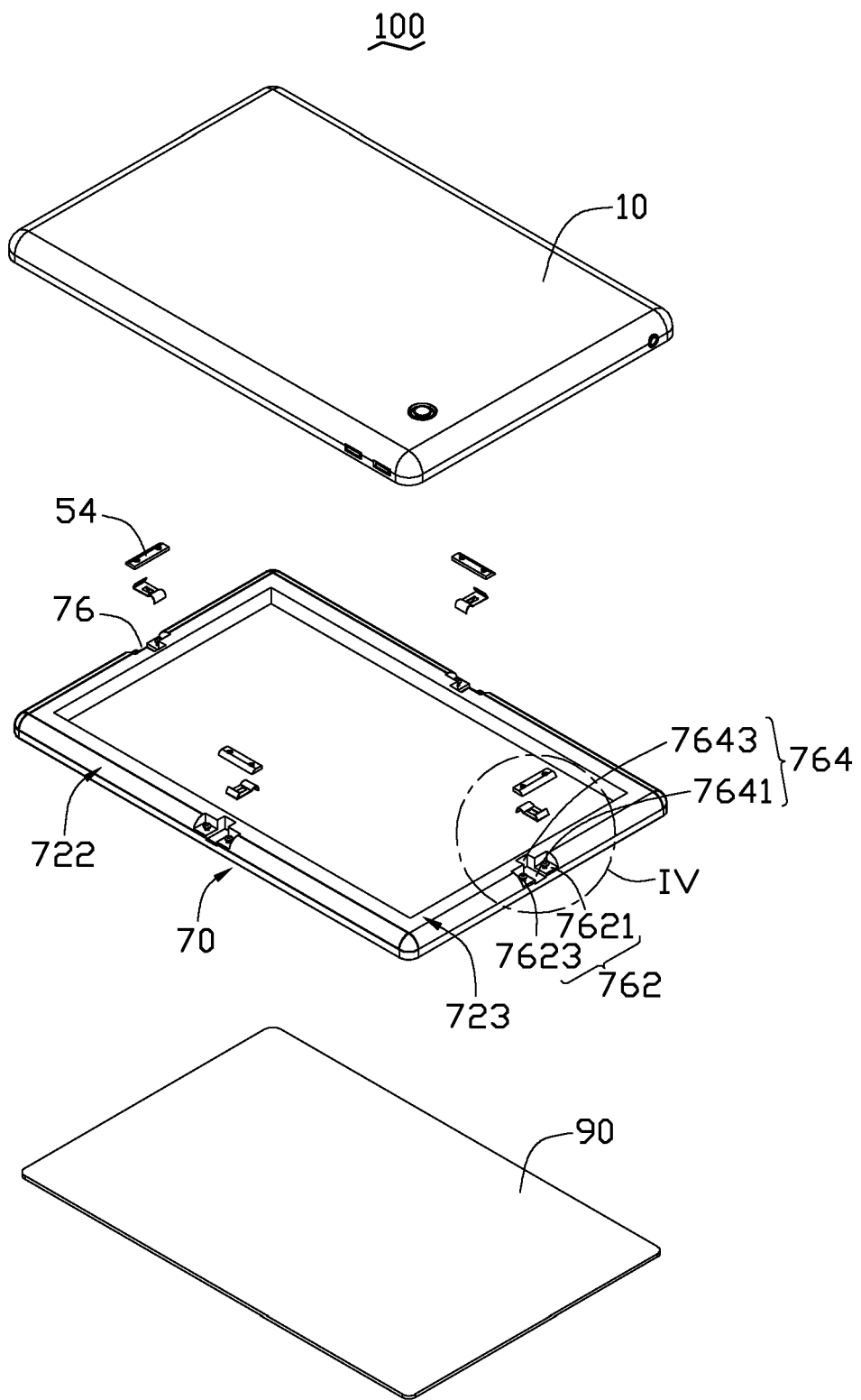
FIG. 3 is similar to FIG. 2, but viewed from another aspect.
Figure 4:
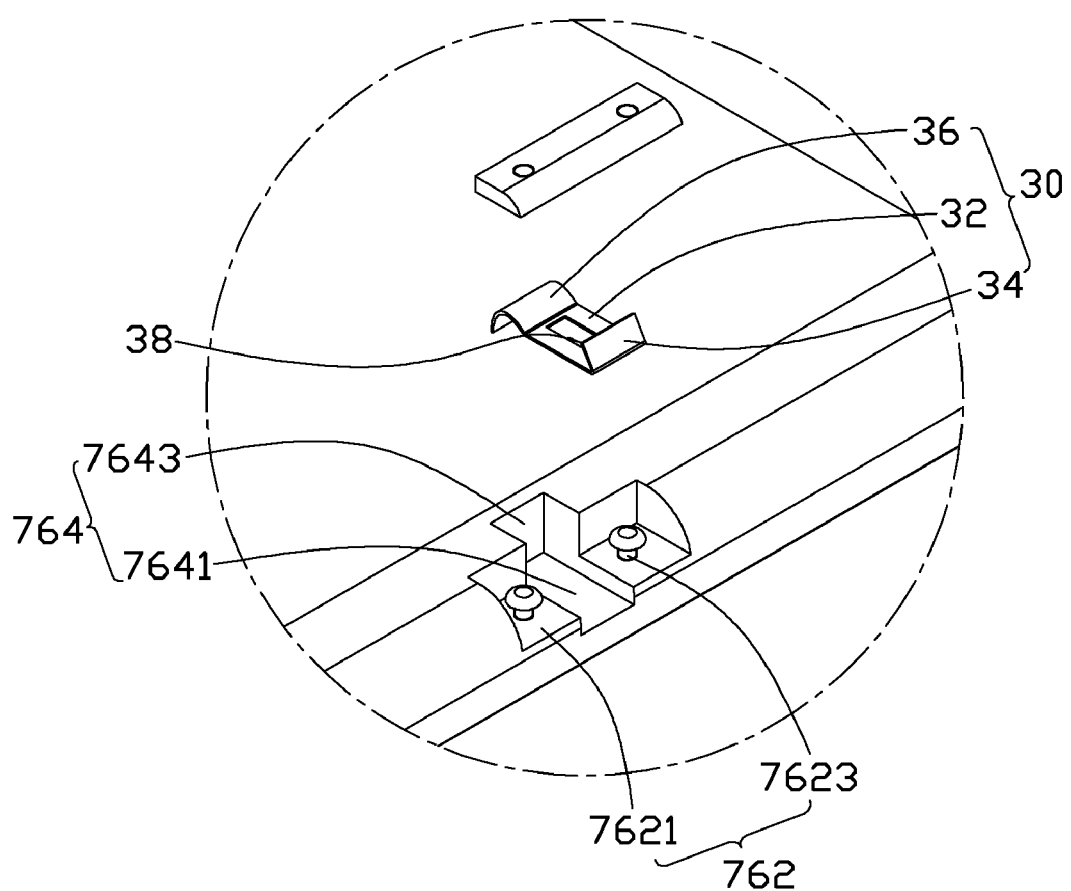
FIG. 4 is an enlarged view of a circled portion IV of FIG. 3.
Figure 5:
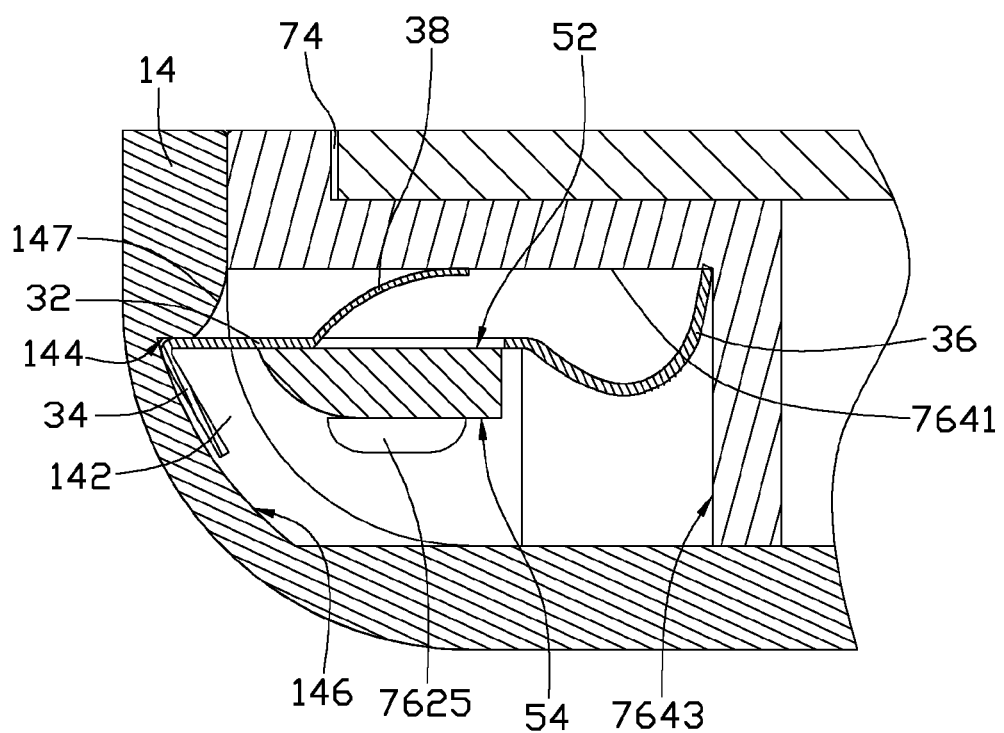
FIG. 5 is a partial, enlarged, cross section of the electronic device taken along line V-V shown in FIG. 1.

Referring to FIGS. 3 through 5, the inner frame 70 includes four connecting sidewalls 72. The inner frame 70 is received in the housing 10. Each connecting sidewall 72 includes an outer surface 722, a top surface 723 and a bottom surface 724 (shown in FIG. 2), the outer surface 722 interconnects the top surface 723 and the bottom surface 724. The outer surface 722 has a shape similar to that of the inner surface 141. The top surface 723 and the bottom surface 724 are planar surfaces, and are parallel to each other.

The inner frame 70 includes a receiving portion 74 and four fixing portions 76 corresponding to the four elastic latching members 30 respectively. The receiving portion 74 is a continuous recess depressed from an inner side of the bottom surface 724 to receive the panel 90. The fixing portion 76 is depressed in the outer surface 722, and includes a fixing recess 762 and a receiving recess 764 communicating with the fixing recess 762. The fixing recess 762 includes a fixing surface 7621 parallel to the top surface 723, and two fixing protrusions 7623 protruding from the fixing surface 7621 and corresponding to the two through holes 56. The fixing protrusion 7623 is substantially cylindrical and has a radius less than that of the through hole 56. The two fixing protrusions 7623 are spaced apart by the receiving recess 764. In the illustrated embodiment, the inner frame 70 is made of plastic, such that the fixing protrusion 7623 can be formed and melted by heat.

The receiving recess 764 depresses from the middle portion of the fixing recess 762. The receiving recess 764 extends perpendicular from the top surface 723 toward the bottom surface 724, and parallel to the top surface 723 toward an inner side of the inner frame 70. The receiving recess 764 includes a first resisting surface 7641 parallel to the top surface 723, and a second resisting surface 7643 extending perpendicularly from the first resisting surface 7641 to the top surface 723. The first resisting surface 7641 adjoins the outer surface 722. In the illustrated embodiment, the fixing portion 76 is defined in the middle portion of the connecting sidewall 72.

The panel 90 is a rectangular plate, and can be received in the receiving portion 74. In the illustrated embodiment, the panel 90 is a touch panel.

Each elastic latching member 30 is received in the corresponding receiving recess 764, the elastic sheet 38 abuts the first resisting surface 7641, an end of the resisting portion 36 of the elastic latching member 30 away from the main portion 32 abuts the joining edge of the first resisting surface 7641 and the second resisting surface 7643. The main portion 32 is substantially parallel to the first resisting surface 7641, and the latching portion 34 protrudes from the receiving recess 764. The fixing member 50 is received in the fixing recess 762, each of the fixing protrusions 7623 is received in the corresponding through hole 56 and is protruded from the second surface 54, and the first surface 52 abuts the fixing surface 7621 of the fixing recess 762. An end of the fixing protrusion 7623 protruding from the second surface 54 is heated to melt, and is then pressed by a tool (not shown) to form a convex end cap 7625. The convex end cap 7625 abuts the second surface 54, such that the fixing member 50 is fixed to the fixing recess 762. The main portion 32 of the elastic latching member 30 abuts the first surface 52 of the fixing member 50, the elastic sheet 38 abuts the first resisting surface 7641, the resisting portion 36 abuts the joining edge of the first resisting surface 7641 and the second resisting surface 7643, such that the elastic latching member 30 is fixed to the receiving recess 764.

In assembly, the inner frame 70 is placed on the housing 10, and each elastic latching member 30 is positioned corresponding to the locking portion 142. The inner frame 70 is moved towards the housing 10, and the latching portion 34 of the elastic latching member 30 abuts a top of the sidewall 14. As the inner frame 70 moves further, the sidewall 14 resists the latching portion 34, such that the elastic latching member 30 pivots around an end of the resisting portion 36 away from the main portion 32, and abuts the first resisting surface 7641, such that the elastic sheet 38 is deformed. The first resisting surface 7641 and the sidewall 14 cooperatively resist the elastic latching member 30 to deform the resisting portion 36, and the resisting portion 36 is compressed inward, such that the inner frame 70 is received in the housing 10, the outer surface 722 of the connecting sidewall 72 abuts the inner surface 141 of the corresponding sidewall 14, and the top surface 723 abuts the base 12. The elastic latching member 30 returns to its original shape when the latching portion 34 protrudes from the receiving recess 764 and is latched and received in the locking portion 142, and the latching portion 34 abuts the abutting surface 144 and the connecting surface 146; thus, the inner frame 70 is fixed to the housing 10. The panel 90 is securely received in the receiving portion 74 of the inner frame 70 by adhesive bonding or other bonding technology.

The inner frame 70 can be detached from the housing 10 by using a tool (such as a suction cup). During disassembly, the latching portion 34 is applied to resist the rounded corner 147 until the elastic latching member 30 is compressed inwardly in the receiving recess 764, such that the inner frame 70 is detached from the housing 10.

The elastic latching member 30 is fixed to the inner frame 70 via the fixing member 50, and the fixing member 50 is fixed to the inner frame 70 by hot melt technology. The structure of the housing 10 and the inner frame 70 are relatively simple, and the housing 10 and the inner frame 70 may be mass produced and assembled. Therefore, a cost of manufacture of the electronic device 100 is decreased.

It should be pointed out that two or more elastic latching members 30, rather than four, such as the two elastic latching members 30 can be fixed to the opposite connecting sidewall 70 respectively. The electronic device 100 may employ more than two elastic latching members 30, whereby the number of the fixing portion 76, the fixing member 50, and the locking portion 142 are changed accordingly.

The elastic sheet 38 may be omitted, whereby the latching portion 34 of the elastic latching member 30 is received in the locking portion 142, the latching portion 34 abuts the abutting surface 144 and the connecting surface 146, the resisting portion 36 abuts the joining edge of the first resisting surface 7641 and the second resisting surface 7643 to make the main portion 32 abut the fixing member 50, such that the inner frame 70 is fixed to the housing 10.

The fixing member 50 may be fixed to the inner frame 70 by welding or riveting when the inner frame 70 is made of metal materials.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An electronic device, comprising:
   a housing comprising a base and a plurality of sidewalls extending from the periphery of the base, each of the sidewalls comprising an inner surface;
   at least two elastic latching members;
   an inner frame received in the housing; and
   at least two fixing members, wherein the housing defines at least two locking portions in the two opposite inner surfaces, each of the locking portions comprises an abutting surface adjoining the inner surface and a connecting surface extending from the abutting surface to the base, and the elastic latching member abuts the abutting surface and the connecting surface, the abutting surface and the inner surface cooperatively forms a rounded corner at a joint of the abutting surface and the inner surface, the inner frame defines at least two fixing portions, the at least two elastic latching members are fixed to a corresponding fixing portion of the at least two fixing portions by the fixing members, and each of the elastic latching members protrudes from the corresponding fixing portion, and is latched with the corresponding locking portion.

2. The electronic device of claim 1, wherein the inner frame comprises a plurality of connecting sidewalls, each of the connecting sidewalls comprises an outer surface abutting the inner surface of the housing, a top surface, and a bottom surface, the outer surface interconnects the top surface and the bottom surface, and the fixing portion is defined in the outer surface.

3. The electronic device of claim 2, wherein each fixing portion forms at least one fixing protrusion, and the fixing member defines at least one through hole corresponding to the at least one fixing protrusion, the at least one fixing protrusion is received in the at least one through hole and protrudes from the fixing member, and an end of the fixing protrusion protruding from the fixing member forms a convex end cap abutting the fixing member.

4. The electronic device of claim 3, wherein each fixing portion comprises a fixing recess and a receiving recess communicating with the fixing recess, the receiving recess depresses from the middle portion of the fixing recess, the fixing protrusion is formed at the fixing recess, and the elastic latching member is received in the receiving recess and abutting the fixing member.

5. The electronic device of claim 4, wherein the receiving recess comprises a first resisting surface adjoining the outer surface and a second resisting surface extending perpendicularly from the top surface to the first resisting surface; the elastic latching member comprises a main portion, a latching portion formed at one end of the main portion, and a resisting portion formed at the other end of the main portion; the latching portion latches with the locking portion, and the resisting portion abuts a joining edge of the first resisting surface and the second resisting surface.

6. The electronic device of claim 5, wherein the latching portion and the main portion cooperatively define an acute angle.

7. The electronic device of claim 5, wherein the elastic latching member further comprises an elastic sheet extending from the main portion towards a side of the main portion and abutting the first resisting surface.

8. The electronic device of claim 7, wherein the latching portion and the elastic sheet are at opposite sides of the main portion.

9. The electronic device of claim 2, further comprising a panel, wherein the inner frame defines a receiving portion depressed from an inner side of the bottom surface, and the panel is securely received in the receiving portion.

10. The electronic device of claim 9, wherein the panel is a touch panel.

11. An electronic device, comprising:
a housing;
at least two elastic latching members;
an inner frame received in the housing, wherein the inner frame comprises a plurality of connecting sidewalls, each of the connecting sidewalls comprises an outer surface abutting the inner surface of the housing, a top surface, and a bottom surface, the outer surface interconnects the top surface and the bottom surface; and
at least two fixing members, wherein the housing defines at least two locking portions, the inner frame defines at least two fixing portions defined in the outer surface, the fixing portion forms at least one fixing protrusion, the at least two elastic latching members are fixed to a corresponding fixing portion of the at least two fixing portions by the fixing members, and each of the elastic latching members protrudes from the corresponding fixing portion, and is latched with a corresponding locking portion of the at least two locking portions, the fixing member defines at least one through hole corresponding to the at least one fixing protrusion, the fixing protrusion is received in the at least one through hole and protrudes from the fixing member, and an end of the fixing protrusion protruding from the fixing member forms a convex end cap abutting the fixing member.

* * * * *